United States Patent [19]

Van Manen

[11] 4,172,745

[45] Oct. 30, 1979

[54] METHOD OF MAKING AUTOMOTIVE TRIM STRIP LAMINATE

[75] Inventor: Dick T. Van Manen, Canandaigua, N.Y.

[73] Assignee: Voplex Corporation, Pittsford, N.Y.

[21] Appl. No.: 885,541

[22] Filed: Mar. 13, 1978

[51] Int. Cl.$^2$ ............................................ B32B 31/16
[52] U.S. Cl. ...................... 156/84; 156/160; 156/229; 156/244.24; 264/339; 264/342 RE
[58] Field of Search ................. 156/84, 85, 160, 163, 156/164, 244.24, 229; 264/178 R, 234, 235, 237, 288, 291, 292, 342 R, 342 RE, 348; 280/762; 296/41, 93

[56] References Cited

U.S. PATENT DOCUMENTS

| | | | |
|---|---|---|---|
| 2,140,711 | 12/1938 | Mitchell | 156/164 |
| 3,068,525 | 12/1962 | Linton et al. | 264/342 R |
| 3,361,728 | 1/1968 | Coen et al. | 264/342 RE |
| 3,461,199 | 8/1969 | Campbell | 264/342 RE |
| 3,531,348 | 9/1970 | Kuneuicius | 264/288 |
| 3,600,250 | 8/1971 | Evans | 156/244.24 |
| 3,632,726 | 1/1972 | Knox et al. | 264/348 |

*Primary Examiner*—Caleb Weston
*Attorney, Agent, or Firm*—Stonebraker, Shepard & Stephens

[57] ABSTRACT

An automotive trim strip laminate formed of a thin strip of polyester material bearing a layer of metallic material and bonded to a substrate of a polyvinyl chloride material is made so that the laminate can be thermally bonded to a support material along a curved path without any wrinkling or other irregularity. This is done by longitudinally tensioning the laminate after it has cooled below its annealing temperature following extrusion of the substrate to strain the laminate sufficiently so that it tends to shorten upon reheating to its annealing temperature. The strain is insufficient to cause strain-relief shortening of the laminate at ambient temperatures encountered during storage and transport but is sufficient so that when the strained laminate is held accurately to the curved path and thermally bonded to the support material, its thermal expansion cooperates with strain relief to bring the laminate into smooth and uniform conformity with the curved path.

2 Claims, 3 Drawing Figures

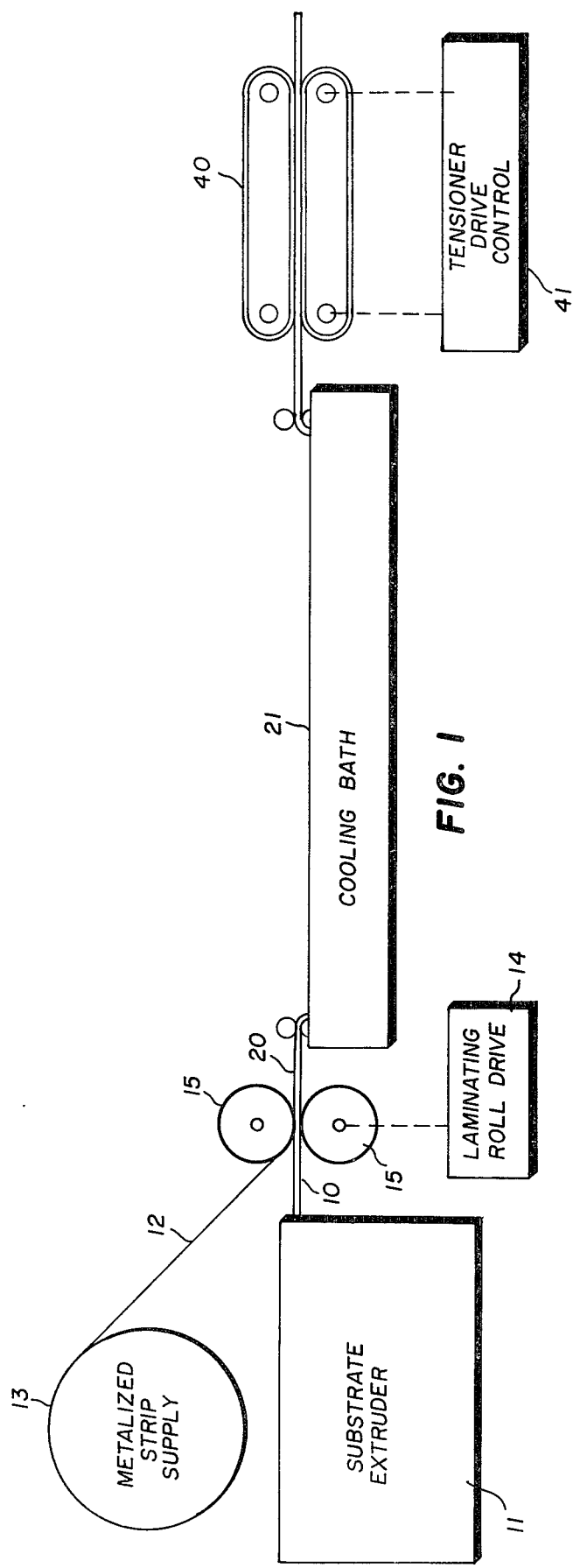
FIG. 1
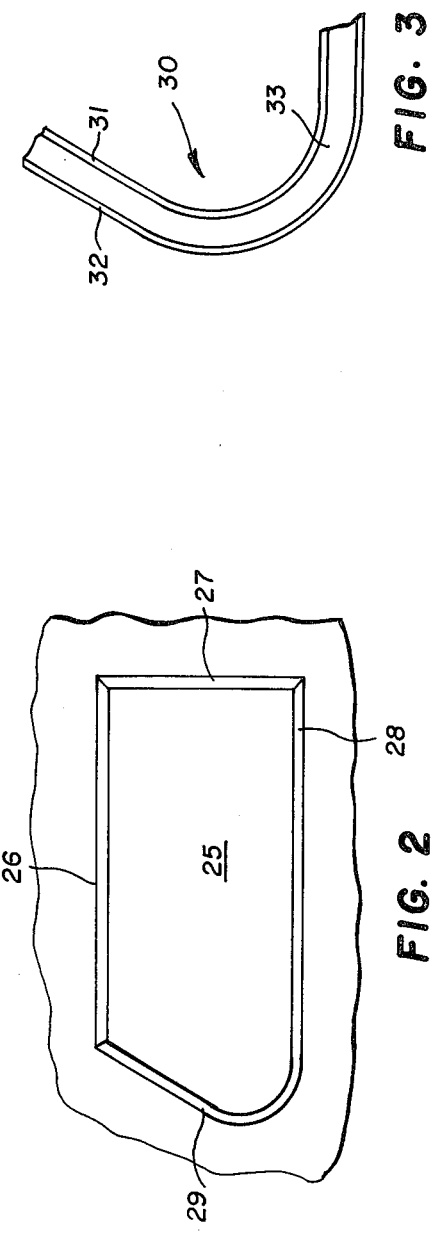
FIG. 2
FIG. 3

METHOD OF MAKING AUTOMOTIVE TRIM STRIP LAMINATE

BACKGROUND OF THE INVENTION

Automotive trim strips have been formed of laminates that give an appearance of bright metallic strips. A typical laminate includes a thin strip of polyester material bearing a layer of metallic material and bonded to a substrate of a polyvinyl chloride (PVC) material. The metallic layer is vacuum deposited on the polyester material, which is a thermo-setting resin that is not plasticizable upon heating. One or several polyester strips can be bonded to a single PVC substrate, and many different widths and cross-sectional configurations can be used, depending on the visual and functional effects desired. Such automotive trim laminates are made by extruding the PVC substrate, bonding one or more polyester strips bearing a metallic layer to the PVC substrate to form a laminate that is cooled and later mounted on a support panel. Such strips can have protective exterior resin coatings and can be mounted along the outside of an automobile or truck body, and they can also be mounted on inside door panels, dashboards, seats, and other places in the interiors of automobiles and trucks.

The visual appearance of metalized plastic automotive trim strips requires uninterrupted uniformity in the smoothness and highly polished appearance of the metallic layer that is visible through the polyester material. For automotive design purposes, it is also desirable to mount such automotive trim strips along curved paths as well as straight paths, and this leads to problems solved by the invention.

The usual way of mounting metalized plastic automotive trim strips to an interior door panel, for example, is to hold the trim strip accurately in place on the door panel with a holding die while the strip and its support surface are heated, preferably by dielectric heating, to thermally bond the trim strip to the door panel. Automotive design also requires that the mounted trim strips fit accurately to the desired path and remain securely attached and dimensionally stable throughout the temperature extremes likely to be encountered by an automobile.

When trim strips made according to prior art methods are thermally mounted along curved paths disfigurement occurs that spoils their appearance. The radially inner edge of a curved trim strip develops slight irregularities or tiny wrinkles that appear to be defects and spoil the otherwise smooth metallic appearance.

The invention involves recognition and study of the causes and possible solutions of the problems of mounting metalized plastic automotive trim strips along curved paths. The invention proposes a simple and effective way to make a metalized plastic automotive trim strip so that it is thermally mountable along a curved path without spoiling the uniformity of its appearance. The inventive solution also aims at economy, simplicity, and effectiveness in meeting all automotive design requirements for metalized plastic automotive trim strips while allowing such strips to be thermally mounted along curved paths.

SUMMARY OF THE INVENTION

The inventive method applies to a laminate formed of at least one longitudinally extending, straight strip of a polyester material bearing a layer of metallic material and bonded to a longitudinally extending, straight substrate of a PVC material. The method begins with extrusion of the PVC substrate and bonding of the polyester material to the substrate to form the laminate while the substrate is above its annealing temperature, and thereafter cooling the laminate. The method involves longitudinally tensioning the laminate during cooling of the laminate below its annealing temperature to strain the laminate so the laminate tends to shorten upon reheating of the laminate to its annealing temperature. The strain of the laminate is insufficient to cause strain relief shortening of the laminate at ambient temperatures encountered during storage and transport, and the strain of the laminate is sufficient so that when the strained laminate is held accurately to a curved path and thermally bonded to a support material along the curved path, expansion of the laminate in response to the thermal bonding cooperates with relief of the strained laminate in response to the thermal bonding to bring the laminate into smooth and uniform conformity with the curved path. The strain of the laminate is also preferably sufficient to produce a 2 to 3½% longitudinal shrinkage of the laminate when the laminate is heated to 185° F. for 2 hours, as presently required for automotive purposes.

DRAWINGS

FIG. 1 is a schematic diagram of preferred steps in the inventive process;

FIG. 2 is an elevational view of a trim strip made according to the invention and mounted along a curved path on a door panel; and FIG. 3 is an enlarged, fragmentary view of a curved-path portion of a trim strip made according to the inventive method.

DETAILED DESCRIPTION

The art of making metalized plastic automotive trim strips is well developed so that several of the steps schematically illustrated in FIG. 1 are well known. These include forming a PVC substrate 10 with an extruder 11, guiding metalized polyester strips 12 from a supply reel 13 to the nip of a pair of laminating rolls 15 driven by a laminating roll drive 14 for bonding the metalized strips 12 to the PVC substrate 10 to form a trim strip laminate. Many cross-sectional configurations for substrate 10 can be used, and different numbers and widths of metalized polyester strips 12 can be bonded to substrate 10 to achieve different visual effects. After laminate 20 is formed at laminating rolls 15, it is cooled, preferably by passing through water in cooling bath 21, and then it is rolled up, cut to lengths, made into subassemblies, or otherwise prepared for sale. Automotive manufacturers can buy indefinite lengths that are later cut and mounted, or can buy subassemblies of joined lengths of trim strip having a predetermined configuration suitable for mounting on a support material. The problem solved by the invention arises when such metalized plastic trim strips are thermally mounted along curved paths, as explained more fully below.

The trim shown in FIG. 2 is mounted on the illustrated fragment of an inside door panel 25 and is formed of four lengths 26–29 mitered together. Length 29 follows a curved path to illustrate the problem solved by the invention. Trim strip length 29 is formed as a straight linear extrusion and is forced into the illustrated curved path when the trim strip is mounted on door panel 25. A die (not shown) holds the trim strip accurately to its mounting path and prohibits any substantial excursion of the trim strip as it is dielectrically heated to be thermally bonded in place. The curvature thus imposed on trim strip length 29, although advantageous from a design point of view, often spoils the smooth metallic appearance of the trim strip and makes curved path mounting impractical.

The curved path for a trim strip fragment 30 as shown in FIG. 3 illustrates another way that appearance problems can arise with trim strips of metalized plastic material. Trim strip 30 has two beads or edge strips 31 and 32 of metalized polyester material extending along each edge of a PVC substrate 33. As strip 30 is forced to conform to a curved path, outer strip 32 is subjected to tension, and inner strip 31 is subjected to compression. It is possible for tension to cause slight cracks or separations in outer strip 32, but a more frequent and difficult problem is a multitude of tiny irregularities that occur along the curved portion of inner strip 31. These are apparently caused by compression wrinkling as materials expand and contract during the thermal bonding process and produce compressive stresses along the radially inner edge of the curvature. The resulting trim strip appears flawed with a multitude of transverse lines being visible in its otherwise smooth metallic appearance.

The inventive solution to the problem of curving metalized plastic automotive trim strips is to subject the laminate to longitudinal tensioning after the laminate cools below its annealing temperature so as to strain the laminate sufficiently so that it tends to shorten upon reheating to its annealing temperature. Such tensioning is shown schematically in FIG. 1 by tensioner 40 formed as a pair of endless belts engaging opposite sides of laminate 20 and driven to advance laminate 20 at a slightly faster linear rate than the speed of laminating rolls 15. The drive for tensioner 40 is preferably adjustable so as to subject any particular laminate to a desired amount of strain, and this is accomplished by a generally known drive control 41. Tensioner 40 can also have other forms, such as a pair of opposed rollers.

The strain caused by stretching laminate 20 after it is cooled below its annealing temperature is preferably enough to accomplish an elongation of 1% or more and is preferably sufficient to produce a 2 to 3½% longitudinal shrinkage of the laminate when the laminate is heated to 185° F. for 2 hours. This is slightly above the annealing temperature of about 170° F. for the PVC material. The 2-hour bake at 185° F. is a present automotive test for dimensional stability of potentially shrinkable plastic parts, and trim strips made according to the invention and thermally mounted in place are preferably able to pass a heat shrinkage test without exceeding the allowed shrinkage value. The strain of the laminate from stretching during cooling is also insufficient to cause strain relief shortening of the laminate at ambient temperatures encountered during storage and transport so that the laminate is dimensionally stable while enroute from its place of manufacture to its place of assembly into an automobile. The strain of the laminate is also sufficient so that when the strained laminate is held accurately to a curved path and thermally bonded to a support material along the curved path, expansion of the laminate in response to the thermal bonding cooperates with relief of the strained laminate in repsonse to the thermal bonding to bring the laminate into smooth and uniform conformity with the curved path.

A prestrained trim laminate as a solution to the curved path mounting problem goes against the usual practice in the art of relieving strain in trim laminates to make them as dimensionally stable as possible. Prestraining apparently operates by giving the laminate a strain relief tendency to shrink longitudinally when heated during the thermal bonding process so that its strain-relief shrinkage tendency counterbalances the thermal expansion of the materials subjected to the heat that accomplishes fusion and bonding. The co-efficients of expansion are different for the PVC substrate and the polyester material, and relative movement that occurs between materials as the thermal bonding occurs is apparently responsible for producing the irregularities that disfigure the visual appearance. The preferred strain sufficient to produce 2 to 3½% shrinkage upon reheating to annealing temperature is not so extreme as to cause dimensional instability problems during shipment and storage and is generally relieved substantially during thermal bonding so that the mounted trim strip is sufficiently strain-relieved to be dimensionally stable. The preferred strain is also insufficient to cause disfigurement problems during production and is adequate to conform the trim strips smoothly to a curved path.

Trim strip subassemblies formed of several lengths of metalized plastic laminate can be made of both strained and unstrained laminates to achieve different effects. For example, relatively long and uncurved lengths of laminate can be made of unstrained material for maximum dimensional stability, and relatively short and curved lengths can be formed of strained laminate material for accommodating the trim strip to curved paths without any appearance disfigurement. For example, length 29 of the trim strip of FIG. 2 can be formed of strained material, and lengths 26–28 can be formed of unstrained material. Also, different amounts of strain can be used to accommodate a laminate to different radii of curvature or to give different configurations of laminates the appropriate strain relief potential to accommodate a desired curve.

I claim:

1. A method of making an automotive trim strip laminate that can be thermally bonded to a support material to extend along a curved path, said laminate being formed of at least one longitudinally extending, straight strip of a thin polyester material bearing a layer of metallic material and bonded to a longitudinally extending, straight substrate of a polyvinyl chloride material, said method comprising:

a. extruding said polyvinyl chloride substrate;
   b. bonding said polyester material to said substrate to form said laminate while said substrate is above its annealing temperature and thereafter cooling said laminate;
   c. longitudinally tensioning said laminate after said cooling of said laminate below said annealing temperature to strain said laminate so said laminate tends to shorten upon reheating of said laminate to said annealing temperature;
   d. said strain of said laminate being insufficient to cause strain-relief shortening of said laminate at ambient temperatures encountered during storage and transport of said laminate; and
   e. said strain of said laminate being sufficient so that when said strained laminate is held accurately to said curved path and thermally bonded to said support material along said curved path, expansion of said laminate in response to said thermal bonding cooperates with relief of said strained laminate in response to said thermal bonding to bring said laminate into smooth and uniform conformity with said curved path.

2. The method of claim 1 wherein said strain of said laminate is sufficient to produce a 2 to 3½% longitudinal shrinkage of said laminate when said laminate is heated to 185° F. for 2 hours.

* * * * *